United States Patent [19]

Law

[11] Patent Number: 4,636,707
[45] Date of Patent: Jan. 13, 1987

[54] POWER GENERATING EQUIPMENT
[75] Inventor: Hilton Law, Leicester, England
[73] Assignee: The English Electric Company Limited, England
[21] Appl. No.: 767,197
[22] Filed: Aug. 19, 1985
[30] Foreign Application Priority Data
Aug. 20, 1984 [GB] United Kingdom ............ 8421103
[51] Int. Cl.$^4$ ............................................. H02P 9/00
[52] U.S. Cl. ....................................... 322/35; 322/17; 322/40; 290/44; 290/55
[58] Field of Search ............ 322/17, 35, 40; 290/44, 290/43, 55, 54

[56] References Cited
U.S. PATENT DOCUMENTS
2,518,129  8/1950  Eichhorn ..................... 322/40 X
4,511,807  4/1985  Somerville ...................... 290/44

FOREIGN PATENT DOCUMENTS
58-49096  3/1983  Japan ........................... 322/35
2006998   5/1979  United Kingdom ............ 322/8

Primary Examiner—Patrick R. Salce
Assistant Examiner—Mark D. Simpson
Attorney, Agent, or Firm—Kirschstein, Kirschstein, Ottinger & Israel

[57] ABSTRACT

An alternating current electrical power generating system in which the generator is driven by a prime mover, such as a fluid-driven turbine, whose speed may vary, the generator rotor being coupled to the output shaft of a differential drive unit, one input of which is coupled to the prime mover and the other input of which is coupled to a synchronous generator whose output is fed to a thyristor controlled variable load.

10 Claims, 2 Drawing Figures

POWER GENERATING EQUIPMENT

This invention relates to power generating equipment of the kind in which the rotational speed or torque of a prime mover such as a fluid-driven turbine driving an alternating current generator may vary widely and in a random manner due to fluctuations in the speed of the fluid driving the turbine.

The invention is especially concerned with systems of the kind in which a generator is driven by a wind turbine, but may also include the use of wave or tidal power.

The mean speed of the wind at any particular place tends, in general, to vary relatively slowly, but gusting gives rise to a fluctuating component composed of shorter and randomly varying periods which is superimposed on the mean speed component. Whilst changes in the mean wind speed can usually be catered for by altering the pitch angle of at least part of the turbine blades, shorter duration variations, as are caused by gusting, can give rise to difficulties, in view of the time which it normally takes to alter the pitch angle as a result of the response of the system.

In order to reduce the effect of such fluctuations on the generator in systems as constructed hitherto a degree of angular displacement resilience, as provided for example by a quill shaft or a mechanical gearbox having its casing mounted for limited rotational movement against springs with suitable damping, is commonly incorporated in the coupling between the turbine and generator shafts, but in general such systems can only cope satisfactorily with relatively short period wind gust peaks, for example of not more than five seconds duration, and it is therefore necessary to utilise the blade pitch control in order to deal with fluctuations of longer duration.

In our co-pending Application No. 8406643 there is disclosed a method of compensating for wind speed fluctuations in a wind powered electrical generating system by connecting the generator rotor to the output shaft of a differential drive unit, one input of which is coupled to the wind turbine and the other input of which is coupled to a variable speed reaction machine. This machine controls the torque on the input to the differential drive unit in response to changes in the speed of rotation of the turbine in the sense which tends to compensate for such speed variations and thereby reduce fluctuations of torque on the generator. Thus if the turbine speed drops, the motor will rotate in the motoring direction taking power from the supply, and similarly if the turbine speed increases, the reaction motor will operate as a generator feeding power back into the supply.

This system however, requires regular maintenance and as such is unsuitable for inclement locations such as for off-shore wind turbine farms. There is thus a need to provide a simple gust energy absorption device since the cost of providing an uprated gearbox to withstand cyclic excess torques is very high.

Accordingly, the invention provides an alternating current electrical power generating system of the kind in which an electrical generator is driven by a prime mover whose speed or torque may vary, the generator rotor being coupled to the output shaft of a differential drive unit, one input of which is coupled to the prime mover and the other input of which is coupled to a synchronous generator whose output is fed to a thyristor controlled variable load.

In a preferred embodiment the synchonous generator has a constant excitation using permanent magnets.

Preferably the output of the generator is fed through a 3-phase bridge rectifier into the thyristor controlled variable load which is so regulated as to adjust the load in dependence on the current. The thyristor controlled variable load preferably includes a load resistor which is effectively short circuited by the thyristor at torques up to full load but which is switched in by the thyristor to direct a portion of the current through the resistor when the turbine torque increases above full load.

BRIEF DESCRIPTION OF THE DRAWINGS

One embodiment of the invention and a modification thereof will now be described by way of example with reference to of the drawings, wherein.

DETAILED DESCRIPTION OF THE PREFERRED EMBODIMENTS

Figure 1:
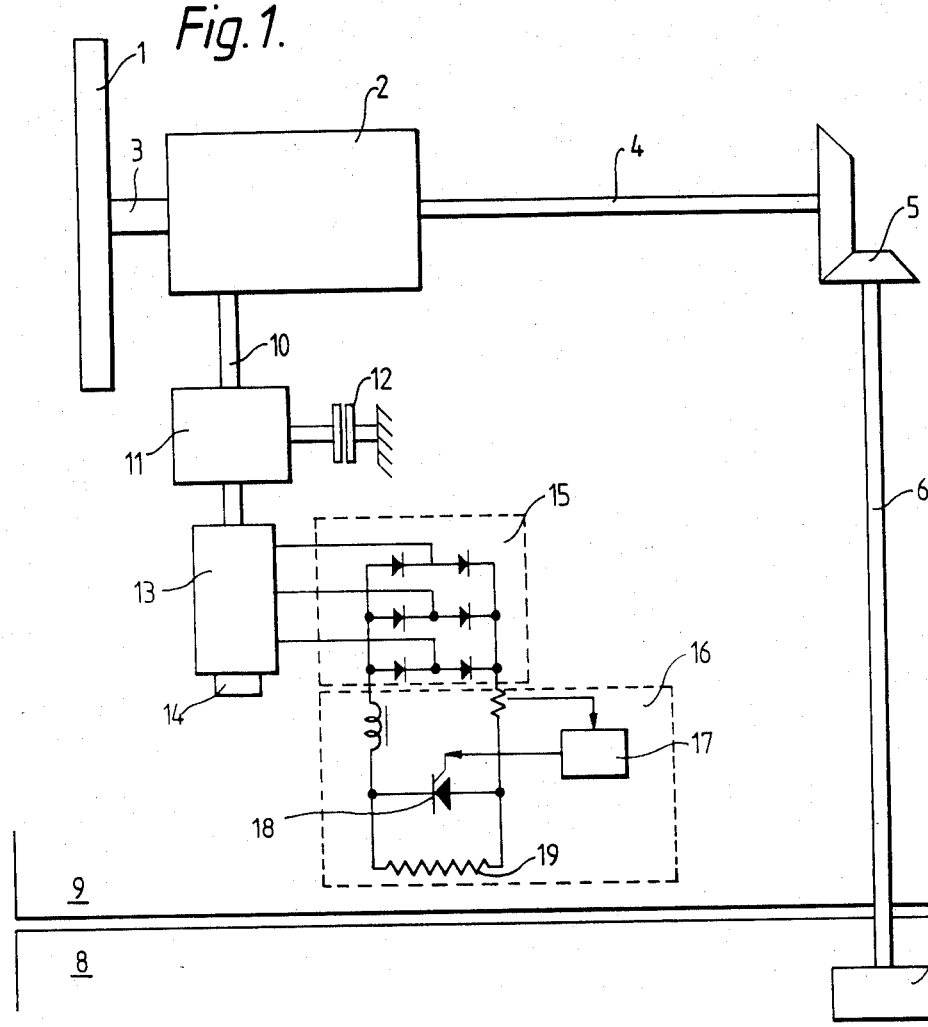
FIG. 1 is a power generating system according to the invention.

The alternating current electrical power generating system shown in FIG. 1 comprises a wind driven turbine 1 coupled via a shaft 3 to one input of a main differential drive unit 2. The output shaft 4 of the drive unit 2 is coupled via bevel gears 5 to the shaft 6 of an electrical induction generator 7. The generator 7 is housed within the body 8 of the tower with its rotor axis vertical and coincident with the axis of rotation of a nacelle 9 accommodating the rest of the system as described. Such an arrangement permits the nacelle 9 to rotate about a vertical axis in dependence upon the wind direction, without the need to rotate the generator stator. However it will be appreciated that the generator could alternatively be mounted in the nacelle.

The second input of the main differential drive unit 2 is coupled to the output shaft 10 of a subsidiary differential gearbox 11 one of whose inputs is coupled to a clutch 12. This is required since the proposed method of start-up is to run up the generator as an induction motor on light load and decoupled from the turbine. The clutch would also limit excessive torques by slipping but this would not occur regularly as an operational requirement.

The other input of the subsidiary differential gearbox 11 is coupled to a reaction machine 13 in the form of a synchronous generator associated with a brake 14. The reaction machine 13 is connected through a 3-phase bridge rectifier 15 into a thyristor controlled variable load 16. This variable load 16 comprises a mark-space ratio current level controller 17, a thyristor 18 and a load resistor 19.

At torques up to full load, the load resistor 19 is effectively short circuited by the thyristor 18 which is controlled by the mark-space ratio current controller 17, and the reaction machine 13 rotates at a speed sufficient to circulate a current through the rectifiers and short circuit. The turbine rotates at a speed slightly above synchronous and the losses in the reaction machine system are small.

As an example, if the full speed of the reaction machine equated to 5% turbine speed difference from generator speed, the rating would be 300 kW for a 6 MW wind turbine generator. At full current and low speed, losses would be about 3% plus 2% for the rectifiers and thyristors—about 5% total, i.e. 15 kW. That is, the turbine would run at 0.25% of synchronous speed above that of the induction generator. The generator itself has a negative slip of approximately 0.5% and thus the total speed increase above synchronous would be about 0.75%, the total heating loss being 45 kW.

When the turbine torque increases above full load, the reaction machine is accelerated producing an increased voltage and current. This current increase is sensed by the current level controller 17 which switches the thyristor so as to divert a portion of the current (according to the mark-space ratio) through the load resistor. The mark-space ratio is adjusted according to the current increase so as to increase the effective load resistance in such a way as to try to keep the current at a constant level. The gust energy is thus absorbed partly by accelerating the turbine and partly by the reaction machine load resistor.

It will be appreciated that the subsidiary differential gearbox 11 may be replaced by a simple magnetic clutch in-line between the second input of the main differential gearbox 2 and the reaction machine 13 is desired.

Figure 2:
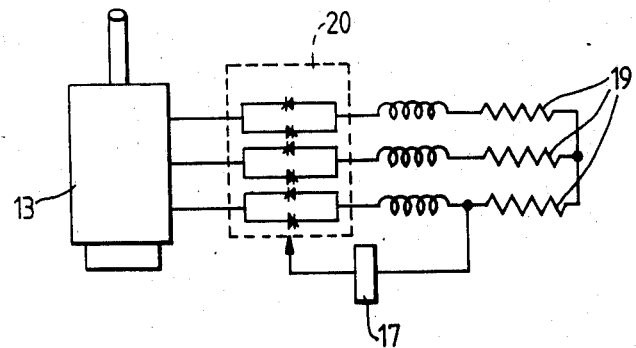
FIG. 2 is a modification of the system.

An alternative means for providing a thyristor controlled variable load is illustrated in FIG. 2 where the output of the synchronous generator 13 is coupled to the load resistance 19 via a three phase thyristor bridge 20 controlled by a current level controller 17.

I claim:

1. An alternating current electrical power generating system comprising: a main electrical generator, a prime mover whose speed or torque could vary in use drivably coupled to the main electrical generator, a differential drive unit having an output shaft coupled to the main electrical generator and two inputs, a synchronous generator having an output, and a thyristor controlled variable load, one input of the differential drive unit being coupled to the prime mover, and the other input of the differential drive unit being coupled to the synchronous generator, the output of the synchronous generator being connected to the thyristor controlled variable load.

2. An alternating current electrical power generating system according to claim 1 wherein the prime mover is a fluid-driven turbine.

3. An alternating current electrical power generating system according to claim 1 wherein the output of the synchronous generator is fed through a 3-phase bridge rectifier into the thyristor controlled variable load which is so regulated as to adjust the load in dependence on the current.

4. An alternating current electrical power generating system according to claim 3 wherein the thyristor controlled variable load includes a load resistor which is effectively short circuited by the thyristor at prime mover torques up to full load but which is switched in by the thyristor to direct a portion of the current through the resistor when the prime mover torque increases above full load.

5. An alternating current electrical power generating system according to claim 1 wherein the said other input of the differential drive unit is coupled to the synchronous generator through a subsidiary differential gearbox.

6. An alternating current electrical power generating system according to claim 5 including a clutch and in which said subsidiary differential gearbox has one output shaft and two input shafts wherein said other input of the differential drive unit is connected to the output shaft of said subsidiary differential gearbox, one input shaft of the subsidiary differential gearbox is coupled to the clutch and the other input shaft of the subsidiary differential gearbox is coupled to the synchronous generator.

7. An alternating current electrical power generating system according to claim 6 wherein the synchronous generator is associated with a brake.

8. An alternating current electrical power generating system according to claim 4 wherein the variable load comprises a mark-space ratio current level controller, a thyristor and said load resistor, so arranged that at prime mover torques up to full load, the load resistor is effectively short-circuited by the thyristor which is controlled by the mark-space ratio current level controller, whereas at and above full load the mark-space ratio current level controller switches the thyristor so as to divert a portion of the current through the load resistor in dependence upon the mark-space ratio.

9. An alternating current electrical power generating system according to claim 1 wherein the thyristor controlled variable load comprises a load resistance connected to the output of the synchronous generator by a three-phase thyristor bridge controlled by a current level controller.

10. An alternating current electrical power generating system according to claim 1 wherein the synchronous generator has a plurality of permanent magnets providing constant excitation.

* * * * *